D. T. GRAY.
REMOVABLE VALVE SEAT.
APPLICATION FILED JUNE 15, 1920.
1,376,427. Patented May 3, 1921.
Fig. 1.
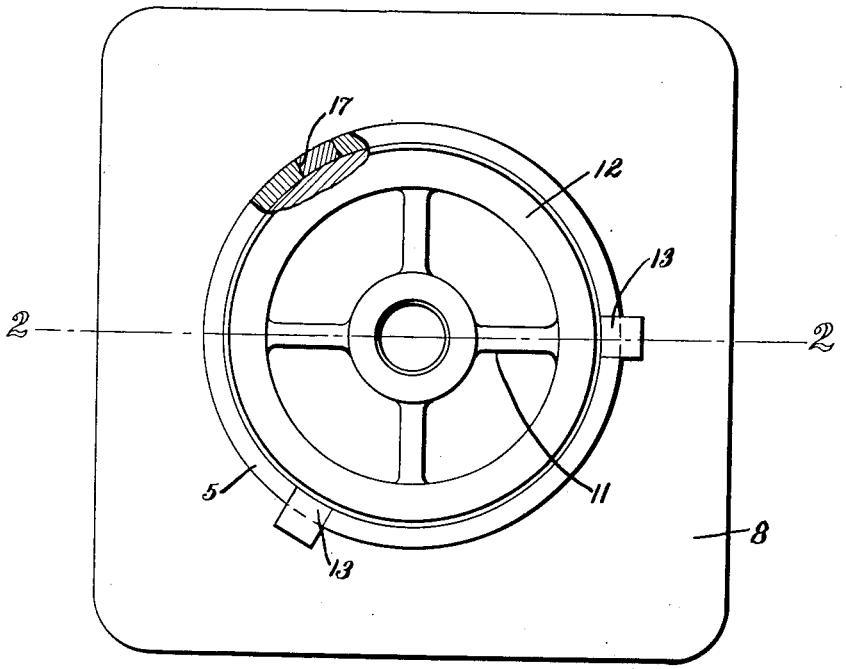
Fig. 2.
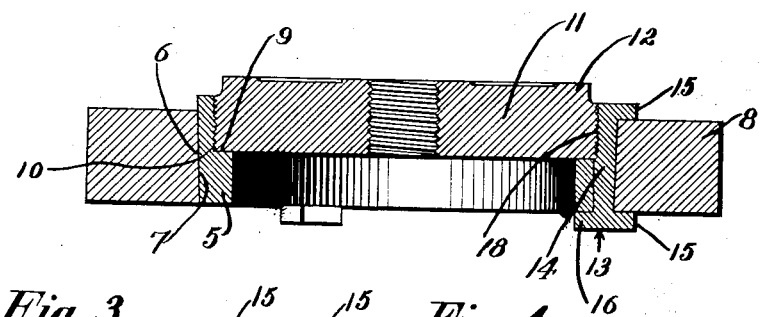
Fig. 3. Fig. 4.
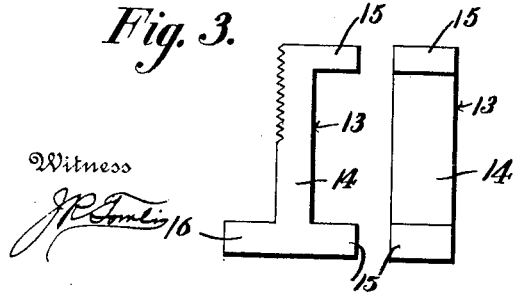
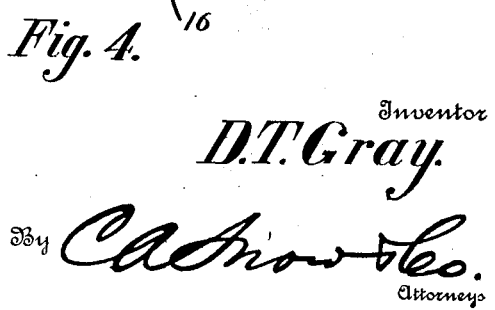
Witness
Inventor
D. T. Gray.
By C. A. Snow & Co.
Attorneys

UNITED STATES PATENT OFFICE.

DANIEL T. GRAY, OF LOUISVILLE, KENTUCKY.

REMOVABLE VALVE-SEAT.

1,376,427.  Specification of Letters Patent.  Patented May 3, 1921.

Application filed June 15, 1920. Serial No. 389,119.

*To all whom it may concern:*

Be it known that I, DANIEL T. GRAY, a citizen of the United States, residing at Louisville, in the county of Jefferson and State of Kentucky, have invented a new and useful Removable Valve-Seat, of which the following is a specification.

This invention relates to removable valve seats and has for its object the provision of a valve seat that is economical in manufacture and installation and that may be removed and replaced by an unskilled mechanic.

With these and other objects in view, appearing as the description proceeds, the invention resides in the novel combination and arrangement of parts hereinafter pointed out and claimed, it being understood that slight changes may be made within the scope of what is claimed without departing from the spirit or sacrificing any of the advantages of the invention.

In the drawing forming a part of this specification and in which similar reference characters designate corresponding parts throughout the several figures:

Figure 1 is a plan view of the device;

Fig. 2 is a section on line 2—2 of Fig. 1;

Fig. 3 is a detail view of a part of the device; and

Fig. 4 is a similar view looking at right angles to the showing of Fig. 3.

Removable valve seats as heretofore produced are of two kinds, namely threadedly connected seats and driven seats. In the former, the valve seats readily removable in case reseating is necessary, but more machine work is required in the manufacture of the valve both on the device to which the valve seat is fitted and on the valve seat itself than is required on a driven seat.

In the driven seat less machine work is required at the time of manufacture but when driven into place it must be calked or upset on the under side of the valve plate to retain it in place, with the result that its removal is an expensive operation.

The present invention aims to eliminate the objectionable features as hereinbefore pointed out and to this end a ring 5 is provided, having its outer surface slightly tapered as indicated at 6, which is adapted to seat in a tapered opening 7 in the valve plate, indicated at 8. The ring 5 is counterbored as shown at 9, said counterbore being threaded at 10. A valve seat spider 11 is exteriorly threaded and is adapted to be seated in the counterbore 9, the valve seat 12 extending above the ring 5. A plurality of retaining members or keys 13 being provided for securing the ring 5 to the valve plate. The members 13 each comprise a body portion 14 having upper and lower lugs 15 projecting therefrom which engage the corresponding faces of the valve plate. The body 14 is also provided at its lower end with a lug 16 which is adapted to support the ring 5.

Slots 17 are formed in the periphery of the ring 5 to receive the body portion 14 of the members 13, and are proportioned so as to cut away the counterbored portion of the ring, so that the keys 13 are exposed within the counterbore, the keys being threaded on this exposed portion as indicated at 18 to correspond with the threaded counterbore.

In assembling the valve seat, and supporting ring the keys 13 are placed in the opening 7 with the lugs 15 engaging the upper and lower faces of the valve plate, the ring 5 is then lowered into the opening 7 the keys 13 entering the slots 17, several light blows are then delivered on the top of the ring 5 to seat the same in the bore 7 and prevent its rotating when the valve seat is screwed in.

It will be apparent that a valve seat constructed in accordance with this invention possesses the advantages of both the driven seat and the threaded seat, since it is unnecessary to thread the valve plate to secure the valve seat in place, thus eliminating the possibility of ruining the threads in the valve plate as may occur in removing a threaded valve seat, thus rendering the plate useless for a standard size valve seat and necessitating rethreading the plate and making an oversize valve seat. It also has the advantage of a screwed in valve seat, since the member 11 can be readily removed for reseating the face 12 and as readily returned and screwed tightly into place. It will here be noted that the threads on parts 9 and 11 are slightly tapered so that when screwed in place it will remain secure in operation.

After the face 12 has been reseated so many times that it is no longer useful the only replacement required is the member 11.

Having thus described the invention what is claimed is:

1. In a device of the class described, an annular member adapted to be seated in a valve plate, a valve seat secured to the annular member and means coöperating with the valve plate, the annular member and valve seat for securing the annular member to the valve plate.

2. In a device of the class described an annular member adapted to be seated in a valve plate, a valve seat secured to the annular member and means coöperating with the valve plate, annular member and the valve seat for securing the said parts together.

3. The combination with a valve plate having a tapered opening, of an annular member adapted to be seated in said opening, the annular member having a slot in the periphery thereof, a key adapted to be seated in the slot, and a valve seat threadedly connected to the annular member and the key, the key coöperating with the valve plate to retain the entire structure in position on the valve plate.

In testimony that I claim the foregoing as my own, I have hereto affixed my signature in the presence of two witnesses.

DANIEL T. GRAY.

Witnesses:
M. J. MALONEY, Sr.,
JOHN F. VOGT.